United States Patent Office 3,647,867
Patented Mar. 7, 1972

3,647,867
PROCESS FOR THE MANUFACTURE OF ACRYLIC ACID BY THE OXIDATION OF PROPYLENE AND/OR ACROLEIN
Kurt Sennewald and Alfred Hauser, Knapsack, near Cologne, and Winfried Lork, Friesheim, near Euskirchen, Germany, assignors to Knapsack Aktiengesellschaft, Knapsack, near Cologne, Germany
No Drawing. Filed Aug. 13, 1968, Ser. No. 752,137
Claims priority, application Germany, Aug. 24, 1967, F 63,188
Int. Cl. C07c 57/04
U.S. Cl. 260—530 N                16 Claims

ABSTRACT OF THE DISCLOSURE

Production of acrylic acid comprising reacting propylene and/or acrolein and/or a substance yielding acrolein under the reaction conditions, such as allyl alcohol, in the gas phase with oxygen at temperatures between 280 and 600° C., under pressures between 0.1 and 10 atmospheres absolute, and for a period of time between 0.1 and 20 seconds, in the presence of steam and in contact with a catalyst consisting of the oxides of silver, iron, bismuth, molybdenum and, if desired, phosphorus, which are present in the atomic ratio of $$Ag_{0.01-1.5}Fe_{0.1-12}Bi_{0.1-12}P_{0-5}Mo_{12}O_{20-110}$$

the catalyst being deposited on a carrier, if desired.

---

The production of acrylic acid by the gas phase-oxidation of propylene in contact with oxidic bismuth-molybdenum-ion catalysts with or without phosphorus oxide has already been described in German published specification 1,241,817. British Pat. 882,140 and 903,034 disclose the production of acrylic acid by the gas-phase-oxidation of acrolein in contact with similar bismuth molybdate-catalysts.

In the production of acrylic acid by such processes, the catalyst activity is found to undergo a rather rapid decrease which can be evened out only partially by a temperature increase. This activity loss of bismuth molybdate-catalysts, which has already been found to occur in the production of acrolein by propylene oxidation (cf. German Pat. 1,196,631, German published specification 1,236,480 and Belgian Pat. 663,817), can be obviated either by means of an excess of oxygen, which must be present in the effluent reaction gas, by vaporization on the catalyst of volatile catalyst constituents, for example molybdenum oxide, or by treatment of the powdery catalyst with aqueous ammonia. Exhaustive catalyst treatment with an air-steam mixture at temperature higher than 300° C. combined, if desired, with a reducing propylene treatment are the steps which alone ensure the complete regeneration of the inactive catalyst, in the production of acrylic acid by propylene oxidation. However, these are very costly possibilities of catalyst regeneration and they result in high production losses, which are entailed by repeated stoppage of the production facilities.

It has now unexpectedly been found that the active lifetime of conventional iron-bismuth-phosphorus-molybdate-catalysts can be considerably prolonged by the addition of small proportions of silver or silver oxide. In accordance with the present invention, acrylic acid is produced by the gas-phase-oxidation of propylene or acrolein in contact with an oxidation catalyst such as that defined by the following general formula:

$$Ag_aFe_bBi_cP_dMo_eO_f$$

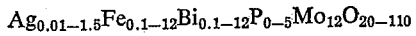

Whereas in the above formula, the $b$ and $c$ indexes may vary within the wide range between 0.1 and 12 and the $d$ index may vary between 0 and 5, given that index $e=12$—the oxygen index $f$ is a function of the catalyst's oxidation stage and varies between 30 and 110—the silver index $a$ has unexpectedly been found to be within the narrow range between 0.01 and 1.5.

Molybdate catalysts activated by means of silver compounds for use in the production of acrylic acid from propylene have already been described in German published specification 1,204,659. However, these catalysts with their considerable proportions of incorporated phosphoric acid produce an acrylic acid yield which is as low as 22% for a 38% propylene conversion rate. Needless to say, therefore, they are unsuitable for commercial use.

The above patent teaches using the silver in concentrations which are very high, referred to the further catalyst metal concentrations. On using these silver concentrations in the present Ag-Fe-Bi-P-Mo-oxide catalysts, these will be found to be completely inactive for the oxidation of propylene into acrylic acid. Catalysts containing too low a silver concentration offer no advantages over silver-free catalysts, whereas catalysts containing too high a proportion of silver may be found to be completely inactive. As can be inferred from this, the range between 0.3 and 4, preferably between 0.5 and 2% by weight Ag—this is referred to the catalyst's total metal content and corresponds to $a$ indexes between 0.01 and 1.5—represents the silver concentration optimum range.

The catalyst which may be deposited on a carrier, such as SiC, $Al_2O_3$ or $SiO_2$, can be produced by mixing a nitric or phosphoric acid solution of silver, bismuth and iron nitrates with powdered molybdenum oxide or ammonium molybdate or with a solution of molybdenum oxide in phosphoric acid and, after evaporation to dryness at 100° C., calcining the catalytically active mass at 350 to 500° C. until the evolution of nitrous gases is found to have died down. The catalyst so produced is comminuted to obtain particles with a size between 4 and 8 mm. which can be used at once or—to improve the dissipation of heat—in loose admixture with an inert solid, such as SiC-particles, in a solid bed reactor. Pulverulent particles can be compressed into pellets or balls, after admixture of a compression auxiliary, such as graphite. Preferably, however, the catalyst is activated in the catalyst bed itself, the catalyst being then pretreated for a period of 2 to 5 hours, at a temperature between 400 and 500° C. with a gas mixture comprising 80% by volume air and 20% by volume steam. This can be combined with a further preteratment step using a dilute propylene-nitrogen-steam-mixture (cf. Ind. Engng. Chem., vol. 49, page 224 (1957)).

The reactor of propylene or acrolein with oxygen to produce acrylic acid is preferably carried out by the process described in German published specification 1,241,817, wherein a gas mixture composed of 3-10% by volume propylene and/or
3-10% by volume acrolein
3-10% by volume oxygen
60-83% by volume carbon monoxide and dioxide, and
5-25% by volume steam is conveyed during a period of time between 0.1 and 20 seconds, at temperatures between 280 and 600° C., preferably between 350 and 520° C., and at pressure between 0.5 and 10 atmospheres absolute, preferably at atmospheric pressure, over the present silver-iron-bismuth molybdate catalyst or silver-iron-bismuth-phosphorus molybdate catalyst, and acrylic acid is isolated from the resulting reaction gas mixture either by partial condensation (cf. DAS 1,241,817) or by extraction as taught in Belgian Pat. 702,492 or Belgian Pat. 707,929.

The present catalysts are more particularly distinguished by their constant high activity and selectivity for the oxidation of propylene or acrolein into acrylic acid. For a productivity of up to 185 grams acrylic acid per liter of catalyst per hour and acrylic acid yields of up to 67%, referred to the propylene conversion rate of substantially 95%, the present catalysts ensure highly economic conditions for the whole process. The catalysts simultaneously enable high acrylic acid concentrations of up to 1.9% by volume to be obtained in the reaction gas mixture for rather low steam concentrations of only 5 to 20% by volume. This means a considerable reduction of the specific quantity of cycle gas needed to produce a given quantity of acrylic acid, and means lower production costs. The acrylic acid solutions obtained by the process carried out with the present catalysts are very concentrated and are therefore accessible to easy finishing treatment into desirable acrylic acid derivatives.

The present invention relates more particularly to a process for the production of acrylic acid comprising reacting propylene and/or acrolein and/or substances yielding acrolein under the reaction conditions, such as allyl alcohol, in the gas phase with oxygen at temperatures between 280 and 600° C., preferably between 350 and 520° C., under pressures between 0.1 and 10 atmospheres absolute, preferably at atmosphereic pressure, and for a period of time between 0.1 and 20 seconds, preferably between 0.1 and 3 seconds, in the presence of steam and in contact with a catalyst, which can be deposited on a carrier, the catalyst being formed of the oxides of silver, iron, bismuth, molybdenum and, if desired, phosphorus, which are present in the atomic ratio of

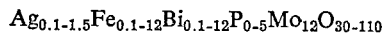

$$Ag_{0.1-1.5}Fe_{0.1-12}Bi_{0.1-12}P_{0-5}Mo_{12}O_{30-110}$$

A first possibility of finishing reaction gas coming from the propylene or acrolein oxidation zone comprises subjecting the said reaction gas, which has a temperature between 280 and 600° C. and consists substantially of acrolein, acrylicacid, acetic acid, formaldehyde, oxygen, inert gases, steam and possibly propylene, to cooling to reduce its temperature down to about 6° C., heating the resulting aqueous acrylic acid solution, which contains small proportions of acetic acid and formaldehyde, and thereby expelling acrolein, and recycling to the oxidation zone resulting vapors together with unliquefied, acrolein-containing residual gas and together with fresh starting material comprising of propylene or acrolein, oxygen and steam, the said starting material being added in each particular case in a molar ratio between about 1:0.5:3 and 1:3:10.

The finishing treatment described above corresponds to the process, which has been disclosed in German published specification 1,241,817 with reference to a flow scheme, and therefore need not be discussed herein greater detail.

A second possibility of finishing reaction gas coming from the propylene or acrolein oxidation zone comprises first subjecting the said reaction gas, which has a temperature between 280 and 600° C. and consists substantially of acrolein, acrylic acid, acetic acid, formaldehyde, oxygen, inert gases, steam and possibly propylene, to a precooling step inside a heat exchanger to reduce the temperature down to a value between 100 and 200° C., preferably between 110 and 150° C., then spraying the reaction gas directly with water having a temperature between 10 and 50° C., preferably between 20 and 40° C. to further reduce the temperature of the reaction gas to a value between 30 and 90° C., heating the resulting aqueous acrylic acid solution of 10 to 45% strength to a temperature between 100 and 120° C. and expelling residual acrolein therefrom, and recycling to the oxidation zone resulting vapors together with unliquefied, acrolein-containing residual gas. The aqueous acrylic acid solution can be used in combination with 0.001 to 2% by weight of a conventional stabilizer. The precooled reaction gas is preferably water-sprayed using 50 to 500 cubic centimeters water per normal cubic meter (N.T.P.) reaction gas.

This second finishing treatment corresponds to the process, which has been disclosed in Belgian Pat. 702,492 with reference to a flow scheme, and therefore need not be discussed here in greater detail.

A third possibility of finishing the reaction gas coming from the propylene or acrolein oxidation zone and having a temperature between 280 and 600° C., comprises subjecting the said reaction gas, which consists of acrylic acid and unreacted propylene and/or acrolein as well as of acetic acid, formaldehyde, steam, oxygen and inert gases, to cooling to reduce the temperature of said gas down to a value between about 90 and 200° C., preferably between about 100 and 170° C., while avoiding condensation of gaseous constituents, and extracting later the reaction gas in countercurrent fashion by means of an ester of an aliphatic or aromatic mono- or dicarboxylic acid, whose alcoholic component contains from 1 to 8 carbon atoms and whose acid component contains from 5 to 20 carbon atoms, or by means of tributyl or tricresyl phosphate, at a temperature between about 30 and 100° C. and a pressure between 0.5 and 5 atmospheres absolute, preferably at atmospheric pressure, the ester being used in a proportion sufficient to produce an extract with an acrylic acid content between about 5 and 35% by weight, preferably between 10 and 25% by weight, and subjecting the resulting extract to distillation to isolate therefrom acrylic acid in the form of a concentrated aqueous solution, say of 70% by weight, and re-using remaining distillation residue for the extraction of further reaction gas containing acrylic acid.

In order to isolate acrylic acid from the reaction gas, it is advantageous to use more particularly the methyl, ethyl, propyl, butyl and ethyl-hexyl esters of oleic acid, adipic acid or ortho-phthalic acid. Complete isolation of the acrylic acid from the reaction gas is ensured given the use of about 50 to 2000 cubic centimeters, preferably 100 to 1000 cubic centimeters of extractant per normal cubic meter reaction gas.

In order to prevent the acrylic acid from polymerizing during the finishing treatment of the reaction gas, it is advantageous to use the extractant in combination with a conventional acrylic acid stabilizer, such as methylene blue, phenothiazine, pyrogallol, p-tertiary-butyl pyrocatechol, copper acetate, acrylate or oleate.

Prior to distilling the acrylic acid, the acrylic acid-containing extract should be preferably be freed from acrolein by treating it at an elevated temperature, preferably at a temperature between about 100 and 140° C., and the acrolein in vapor form should be combined with reaction gas constituents not-absorbed by the extractant, which substantially include steam, unreacted propylene and/or acrolein, formaldehyde, carbon monoxide, carbon dioxide and nitrogen. The resulting gas mixture is cooled later down to a temperature between about 20 and 70° C. to partially condense out reaction water in excess and formaldehyde, and residual gas is returned as cycle gas, together with fresh propylene and/or acrolein, to the oxidation zone.

This third finishing treatment corresponds to the process, which has been disclosed in Belgian Pat. 707,929 with reference to a flow scheme, and therefore need not be discussed here in greater detail.

EXAMPLE 1

(a) Catalyst preparation

A catalyst with the composition

$$Ag_{0.12}Fe_{1.1}Bi_{0.3}Mo_{12}P_{0.1}O_{38.41}$$

and containing about 1% by weight Ag, referred to the catalyst's total metal content, was prepared in the manner set forth below.

8880 grams MoO₃-powder were introduced with agitation into a solution having a temperature of about 50 to 70° C. and produced from 2292 grams $$Fe(NO_3)_3 \cdot 9H_2O$$

740 grams $Bi(NO_3)_3 \cdot 5H_2O$ and 103.2 grams $AgNO_3$ in 2300 cc. water, the water having been acidified with 500 cc. concentrated nitric acid. To the resulting suspension there was added a further 74 grams 85% phosphoric acid. After evaporation to dryness, the catalytically active mass was sintered first for about 10 hours at 350–370° C. and later for a further 10 hours at 460–470° C. The resulting catalyst was crushed and screened to obtain particles with a size between 4 and 6 mm. 350 cc. of the catalyst particles were loosely mixed with 350 cc. silicon carbide particles of identical particle size, the mixture was placed in a U-shaped reactor, and heated therein to a constant temperature of 450° C. by means of a salt bath, the reactor having an inside diameter of 30 mm. The catalyst was activated by a 4-hour treatment comprising the passing over it of 1.3 normal cubic meters/hr. of a gas mixture comprising 20% by volume steam and 80% by volume air. The oxygen was expelled by means of nitrogen, 5% by volume propylene were added to the gas mixture, and the catalyst was subjected to reducing treatment at 450° C., for 40 minutes.

(b) Comparative catalyst

A comparative catalyst composed of

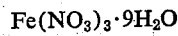
$$Fe_{1.1}Bi_{0.3}Mo_{12}P_{0.1}O_{38.35}$$

but free from silver was prepared and activated in the manner described under (a), save that no silver nitrate was added.

(c) Comparative experiment 350 cc. of each of the two catalysts mixed with 350 cc. silicon carbide particles were used. 1.44 normal cubic meters cycle gas were passed per hour over the catalysts at the temperatures listed in the following table, the cycle gas being fed per hour with a maximum of 37.8 grams=0.9 mol propylene, oxygen and steam so as to produce a fairly constant cycle gas composition of Percent by volume
Propylene ------------------------------------ 6.7
Oxygen -------------------------------------- 4.2
Acrolein ------------------------------------- 7.5
Steam --------------------------------------- 11.0
CO₂ ----------------------------------------- 42.3
CO ------------------------------------------ 27.6
Balance gas (H₂, C₂H₄ and similar gases) ------- 0.7

The reaction gas issued from the reactor at a temperature of 450° C. It was supplied to the head of a packed column 50 cm. long and cooled in the associated cooler mounted thereon, down to 6° C. This produced condensation of the water together with the acrylic acid, acetic acid and formaldehyde. The aqueous solution was freed from dissolved acrolein by heating to 100° C., the acrolein together with residual gas being conveyed as cycle gas to the reactor.

TABLE

| | Catalyst 1a | | | | Catalyst 1b | | |
|---|---|---|---|---|---|---|---|
| Reaction time in hours | Temp., ° C. | Catalyst productivity, acrylic acid in grams per liter per hour | Acrylic acid yield in percent, referred to propylene conversion rate | Reaction time in hours | Temp., ° C. | Catalyst productivity, acrylic acid in grams per liter per hour | Acrylic acid yield in percent, referred to propylene conversion rate |
| 36 | 420 | 111 | 67.4 | 36 | 430 | 113 | 62.4 |
| 94 | 420 | 104 | 63.2 | 84 | 445 | 109 | 66.0 |
| 131 | 430 | 108 | 66.2 | 103 | 450 | 96 | 62.5 |
| 177 | 430 | 111 | 64.9 | 150 | 450 | 50 | 62.0 |

The total propylene conversion rate was 94 to 95%. In the column base, there was obtained per hour a maximum of 40 grams (0.55 mol) acrylic acid, which was a 20% aqueous solution containing a further 1% acetic acid and formaldehyde.

The catalyst productivities were compared. Despite the 20° C. temperature increase, catalyst (1b) was found after as short an operation period as 100 hours to have undergone a 15% loss in activity, which strongly increased further, for smaller average acrylic acid yields.

EXAMPLE 2

A catalyst composed of $Ag_{0.06}Fe_{1.1}Bi_{0.3}Mo_{12}P_{0.1}O_{38.38}$ 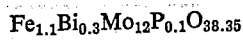 and having a particle size between 0.4 and 0.7 mm. was produced in the manner described in Example (1a) above.

350 cc. of the above catalyst were mixed with 350 cc. SiC-particles, the mixture was placed in a U-shaped reactor 30 mm. wide and heated to a temperature of 430° C. Propylene (40.7 grams/hr.=0.97 mol/hr.), steam and oxygen were added to the cycle gas (1.44 normal cubic meters/hr.) so as to produce a fairly constant cycle gas composition of:

Percent by volume
Propylene ------------------------------------ 6.2
Oxgen --------------------------------------- 4.5
Acrolein ------------------------------------- 6.9
Steam --------------------------------------- 11.3
CO₂ ----------------------------------------- 39.0
CO ------------------------------------------ 31.3
Balance gas (H₂, C₂H₄ and similar gases) ------- 0.8

The sojourn time was about 0.9 second. The reaction gas, which contained about 1% by volume acrylic acid, was subjected to the finishing treatment described in Example (1c) above. Acrylic acid, which was in the form of a 22.5% aqueous solution, was obtained at the rate of 44.6 grams per hour. The acrylic acid yield was 63.8%, referred to the propylene added, or 66.6%, referred to the propylene transformed. The catalyst was found to have a productivity of 127 grams acrylic acid per liter per hour. In addition, there was obtained a 2.5% yield of acetic acid plus a 4% yield of formaldehyde. The experiment was conducted over a total period of 135 hours.

EXAMPLE 3

700 cc. of a catalyst composed of $Ag_{0.12}Fe_{1.1}Bi_{0.3}Mo_{12}P_{0.1}O_{38.41}$ in the form of granules having a particle size between 4 and 6 mm. were used in loose admixture with 700 cc. of SiC-particles of identical size. The mixture was placed in a U-shaped reactor 25 mm. wide and heated to a temperature of 450° C., by means of a salt bath. 1.66 normal cubic meters cycle gas, which was supplied per hour with 87.4 grams (2.08 mols) propylene, were passed per hour over the catalyst. An appropriate proportion of oxygen was added so as to produce a cycle gas having the following average composition:

| | Percent by volume |
|---|---|
| Propylene | 7.2 |
| Oxygen | 7.5 |
| Acrolein | 7.1 |
| Steam | 22.0 |
| $CO_2$ | 29.4 |
| CO | 25.2 |
| Balance gas ($H_2$, $C_2H_4$ and similar gases) | 1.6 |

The mean sojourn time was 1.7 seconds. The reaction gas which contained about 1.6% by volume acrylic acid was subjected to the finishing treatment described in Example (1c) above. Dissolved acrolein was distilled off. Acrylic acid which was in the form of a 21.3% aqueous solution and contained small proportions of acetic acid and formaldehyde, was obtained at a rate of 85.4 grams per hour. The acrylic acid was obtained in a yield of 57%, referred to the propylene added, or 59.6%, referred to the propylene conversion rate. The catalyst productivity was found to be 122 grams acrylic acid per liter per hour. Acetic acid was obtained in a yield of 3.0% and formaldehyde was obtained in a yield of 4.0%. The experiment was conducted over a period of 600 hours. The catalyst activity could not be found to have remarkably decreased.

EXAMPLE 4

1290 cc. of a catalyst having the composition $Ag_{0.12}Fe_{1.1}Bi_{0.3}Mo_{12}P_{0.1}O_{38.41}$ were produced in the manner described in Example (1a) above. Prior to activating the catalyst, the above 1290 cc. were mixed with 5% powdered graphite and the mixture was compressed into pellets 4 mm. wide and 4 mm. high. The pelletized catalyst was placed in a U-shaped reactor 32.5 mm. wide and maintained therein at a temperature of 404–406° C., by means of a salt bath. 2.45 normal cubic meters cycle gas, which was fed per hour with 139 grams (=3.31 mols) propylene, were passed per hour over the catalyst. Oxygen was added so as to produce the following average cycle gas composition:

| | Percent by volume |
|---|---|
| Propylene | 6.0 |
| Oxygen | 7.6 |
| Acrolein | 7.4 |
| Steam | 20.0 |
| $CO_2$ | 31.4 |
| CO | 26.9 |
| Balance gas ($H_2$, $C_2H_4$ and similar gases | 0.7 |

The resulting reaction gas containing 1.85% by volume acrylic acid in vapor form left the reactor after a sojourn time of 0.85 second. It was cooled down to about 140° C. my means of a heat exchanger, and was conveyed then to an extraction column which was operated at 63° C. In that column, the acrylic acid was washed out in countercurrent fashion by the introduction of 200 cc./hr. water near the column head. The steam-saturated cycle gas was returned to the reactor, whereas the issuing gas was withdrawn through a pressure-retaining valve. The acrylic acid solution coming from the extraction column was freed from low-boiling constituents (acrolein and similar compounds) in a stripping column and was withdrawn at a rate of 448 grams per hour. The acrylic acid content was 32.8%. This was found to correspond to an acrylic acid yield of 61.6%, referred to the propylene added, or 63.6%, referred to the propylene transformed. The catalyst productivity was 114 grams acrylic acid per liter per hour. In addition, there was obtained a 2.5% yield of acetic acid plus a 3.5% yield of formaldehyde. The yields and catalytic productivities were found to remain practically constant over a measured period of 225 hours.

EXAMPLE 5

650 cc. of a phosphorus-free catalyst composed of $Ag_{0.12}Fe_{1.1}Bi_{0.3}Mo_{12}O_{38.16}$ were produced in the manner described in Example (1a) above, however, without phosphoric acid, and mixed with 650 cc. SiC-particles. The mixture was heated to a temperature of 430° C. in a solid bed reactor by means of a salt bath. 95 grams/hr. (2.26 mols) propylene were added to the cycle gas (2.45 normal cubic meters); oxygen was added so as to produce a constant cycle gas composition of

| | Percent by volume |
|---|---|
| Propylene | 7.5 |
| Oxygen | 6.3 |
| Acrolein | 7.8 |
| Steam | 20.0 |
| $CO_2$ | 29.0 |
| CO | 27.5 |
| Balance gas ($H_2$, $C_2H_4$ and similar gases) | 2.0 |

The sojourn time of the reaction gas in the reactor was about 0.85 second. The reaction gas, which contained about 1.2% by volume acrylic acid in vapor form, was subjected to the finishing treatment described in Example 3. Acrylic acid, which was in the form of a 25.6% aqueous solution, was obtained at a rate of 95.1 grams (1.32 mols) per hour. The acrylic acid yield was found to be 58.4%, referred to the propylene added, or 61.9%, referred to the propylene transformed. The catalyst was found to have a productivity of 146 grams acrylic acid per liter per hour. In addition, there was obtained a 3% acetic acid yield plus a 3.4% formaldehyde yield. The activity of the catalyst could not be found to have been reduced after an operation period of 165 hours.

EXAMPLE 6

625 cc. of a catalyst composed of $Ag_{0.24}Fe_{2.2}Bi_{0.6}Mo_{12}P_{0.2}O_{40.82}$ was produced in the manner described in Example (1a) and compressed into pellets while adding 5% powdered graphite. After the catalyst had been activated, it was mixed with 625 cc. SiC and heated to a temperature of 425° C. inside a solid bed reactor 32.5 mm. wide. 116.4 grams (2.77 mols) propylene were added per hour to the cycle gas (2.4 normal cubic meters). Oxygen was added so as to produce a constant cycle gas composition of

| | Percent by volume |
|---|---|
| Propylene | 7.4 |
| Oxygen | 7.7 |
| Acrolein | 6.3 |
| Steam | 20.0 |
| $CO_2$ | 30.1 |
| CO | 27.5 |
| Balance gas ($H_2$, $C_2H_4$ and similar gases) | 1.0 |

The reaction gas, which contained about 1.47% by volume acrylic acid in vapor form, was subjected to the finishing treatment described in Example 4. By extraction with 300 cc./hr. water, there was obtained 113.4 grams/hr. acrylic acid in the form of a 22.2% aqueous solution containing 1.5% acetic acid and 1.4% aldehyde. The acrylic acid yield was found to be 56.8%, referred to the propylene added, or 60.7%, referred to the propylene transformed. The catalyst had a productivitiy of 181 grams acrylic acid per liter per hour.

The experiment was carried out over a period of 348 hours.

EXAMPLE 7

A catalyst having the composition $Ag_{0.18}Fe_{7.0}Bi_{2.0}Mo_{12}P_{1.0}O_{52.09}$ was produced in the manner described below.

444 grams $MoO_3$ were dissolved at 90° C. in 6.6 liters water with the addition of 29.7 grams phosphoric acid of 85% strength. The resulting molybdate solution was mixed later with 726 grams $Fe(NO_3)_3 \cdot 9H_2O$, dissolved in 400 cc. water and 20 cc. concentrated nitric acid, 249 grams $(Bi(NO_3)_3 \cdot H_2O)$, dissolved in 200 cc. water and 120 cc. concentrated nitric acid, and 8.2 grams $AgNO_3$, dissolved in 20 cc. water. The resulting suspension was evaporated to dryness. The catalytically active mass was treated further and pelletized with 4% powdered graphite, in the manner already described. On activating the catalyst, the graphite was found slowly to burn off.

Over 625 cc. of the activated catalyst mixed with 625 cc. SiC-particles, there were passed, at a bath temperature of 380° C., 3.3 normal cubic meters/hr. cycle gas composed of:

| | Percent by volume |
|---|---|
| Propylene | 4.2 |
| Oxygen | 6.1 |
| Acrolein | 7.0 |
| Steam | 20.0 |
| $CO_2$ | 39.9 |
| CO | 21.9 |
| Balance gas | 0.9 |

Cycle gas having the composition indicated above was produced by the addition per hour of 128 grams (3.04 mols) propylene and the corresponding variable proportions of oxygen. The reaction gas, which contained about 1.1% by volume acrylic acid in vapor form, was extracted with 375 cc./hr. water in the extraction column, which was operated at 63° C. There were obtained per hour 114 grams acrylic acid in the form of a 19.3% aqueous solution which contained 1.2% acetic acid and 1.9% formaldehyde. The acrylic acid yield was found to be 52.1%, referred to the propylene added, or 53.5%, referred to the propylene transformed, for a catalyst productivity of 182 grams acrylic acid per liter per hour.

The experiment was conducted over a period of 176 hours.

EXAMPLE 8

Over 1270 cc. of a catalyst composed of $Ag_{0.12}Fe_{1.1}Bi_{0.3}Mo_{12}P_{0.1}O_{38.41}$, which was used in the form of pellets having a diameter of 5 mm. and was heated to a temperature of 408° C. in a U-shaped reactor 32.5 mm. wide, there were passed per hour 2.64 normal cubic meters of a cycle gas which was fed per hour with 138.6 grams (3.3 mols) propylene. Oxygen was added in metered quantities so as to produce the following average cycle gas composition:

| | Percent by volume |
|---|---|
| Propylene | 6.9 |
| Oxygen | 8.5 |
| Acrolein | 7.5 |
| Steam | 20.0 |
| $CO_2$ | 26.6 |
| CO | 28.3 |
| $H_2$, $C_2H_4$ and similar gases | 2.1 |

The reaction gas left the reactor after a sojourn time of substantially 0.8 second. It contained about 1.7% by volume acrylic acid, was cooled down to 140° C. in a cooler and conveyed to a bubble tray column 100 mm. wide and having 25 trays. 350 cc. dimethyl phthalate containing 0.1% dissolved phenothiazine stabilizer, were supplied per hour to the column head, whereby the reaction gas was cooled in countercurrent fashion down to a temperature of 70° C., and extracted. Residual gas having a temperature of 70° C. was cooled further down to 64° C., in a warm water-cooled heat exchanger. Reaction water in excess which contained 6.7% formaldehyde was found to condense out at a rate of 114 grams per hour. After the addition of fresh propylene and oxygen, the steam-saturated residual gas was returned anew as cycle gas to the reactor.

The hot acrylic acid-containing phthalic ester solution, which accumulated in the base of the extraction column, was fed to a packed column 50 cm. wide and heated therein to a temperature of 110° C. This was done to remove small amounts of dissolved acrolein. The acrolein which issued near the column head was combined again with residual gas having a temperature of 70° C. 606 grams per hour of a phthalic ester solution containing 23.9% acrylic acid could be removed from the acrolein column. This corresponded to an acrylic acid yield of 60.8%, referred to the propylene used, or 64%, referred to the propylene transformed. The phthalic ester solution was also found to contain a further 6% water and 1% acetic acid. Distillation under a pressure of 40 mm. mercury enabled the acrylic acid to be obtained in the form of a 77% aqueous solution containing about 3% acetic acid. Only traces of formaldehyde were detected. The phthalic ester was recycled to the extraction column.

What is claimed is:

1. A process for the production of acrylic acid comprising reacting propylene, acrolein, a substance yielding acrolein under the reaction conditions, or mixtures thereof, in an oxidation zone, in the gas phase, with oxygen at temperatures between 350 and 520° C., under pressures between 0.1 and 10 atmospheres absolute, and for a period of time between 0.1 and 20 seconds, in the presence of steam and in contact with a catalyst consisting of the oxides of silver, iron, bismuth, molybdenum, and optionally, phosphorus, which are present in the atomic ratio of $Ag_{0.01-1.5}Fe_{0.1-12}Bi_{0.1-12}P_{0-5}Mo_{12}O_{30-110}$.

2. The process of claim 1 wherein the reaction is carried out at atmospheric pressure.

3. The process of claim 1 wherein the reaction is carried out for a period of time between 0.1 and 3 seconds.

4. The process of claim 1 wherein the catalyst is deposited on a carrier.

5. The process of claim 1 wherein reaction gas coming from the oxidation zone having a temperature between 350 and 520° C. and consisting essentially of acrolein, acrylic acid, acetic acid, formaldehyde, oxygen, inert gases, steam and possibly propylene, is cooled to reduce its temperature to about 6° C., the resulting aqueous acrylic acid solution which contains small proportions of acetic acid and formaldehyde is heated thereby expelling acrolein, and the resulting vapors together with unliquified, acrolein-containing residual gas and fresh starting material comprised of propylene or acrolein, oxygen and steam are recycled to the oxidation zone, by starting material being added in a molar ratio between about 1:0.5:3 and 1:3:10.

6. The process of claim 1 wherein the reaction gas coming from the oxidation zone having a temperature between 350 and 520° C. and consisting essentially of acrolein, acrylic acid, acetic acid, formaldehyde, oxygen, inert gases, steam and possibly propylene is subjected to a precooling step to reduce the temperature to between 100 and 200° C., then the reaction gas is sprayed directly with water having a temperature between 10 and 50° C. to further reduce the temperature of the reaction gas to a value between 30 and 90° C., the resulting aqueous acrylic acid solution of 10 to 45% strength is heated to a temperature between 100 and 120° C. thereby expelling residual acrolein therefrom, and the resulting vapors are recycled to the oxidation zone together with unliquified, acrolein-containing residual gas.

7. The process of claim 6 wherein the reaction gas is precooled to a temperature between 110 and 150° C.

8. The process of claim 6 wherein the precooled reaction gas is water-sprayed using 50 to 500 cubic centimeters water per normal cubic meter (N.T.P.) reaction gas.

9. The process of claim 6 wherein the reaction gas is sprayed with water having a temperature between 20 and 40° C.

10. The process of claim 1 wherein the reaction gas coming from the oxidation zone having a temperature between 350 and 520° C. and consisting essentially of acrolein, acrylic acid, acetic acid, formaldehyde, oxygen, inert gases, steam and possibly propylene, is subjected to cooling to reduce the temperature of said reaction gas to between about 90 and 200° C., while avoiding condensation of gaseous reaction gas constituents, and the reaction gas is extracted in countercurrent fashion with an ester of an aliphatic or aromatic mono- or dicarboxylic acid, whose alcohol moiety contains from 1 to 8 carbon atoms and whose acid moiety contains from 5 to 20 carbon atoms at a temperature between about 30 and 100° C. and atmospheric pressure, the ester being used in a proportion sufficient to produce an extract with an acrylic acid content between about 5 and 35% by weight and then distilling the resulting extract to isolate therefrom acrylic acid in the form of a concentrated aqueous solution, and re-using remaining distillation residue for the extraction of further reaction gas containing acrylic acid.

11. The process of claim 10 wherein the extraction is carried out by means of tributyl or tricresyl phosphate.

12. The process of claim 10 wherein the extractant is used at a rate between about 50 and 2000 cubic centimeters per normal cubic meter reaction gas.

13. The process of claim 12 wherein the extractant is used at a rate between about 100 and 1000 cubic centimeters per normal cubic meter reaction gas.

14. The process of claim 10 wherein prior to distilling the acrylic acid, the acrylic acid-containing extract is freed from acrolein by heating it to an elevated temperature.

15. The process of claim 14 wherein the acrolein is removed from the acrylic acid containing extract at a temperature between about 100 and 140° C.

16. The process of claim 14 wherein the acrolein in vapor form is combined with reaction gas constituents not absorbed by the extractant, which substantially include steam, unreacted propylene and/or acrolein, formaldehyde, carbon monoxide, carbon dioxide and nitrogen, the resulting gas mixture is cooled to a temperature between about 20 and 70° C. to partially condense out reaction water and formaldehyde, and the residual gas, together with fresh propylene and/or acrolein is returned as cycle gas to the oxidation zone.

References Cited

UNITED STATES PATENTS

| | | | |
|---|---|---|---|
| 3,405,172 | 10/1968 | Brown et al. | 260—533 N |
| 3,415,872 | 12/1968 | Karnofsky | 260—533 N |
| 3,527,677 | 9/1970 | Harping | 260—533 NX |

FOREIGN PATENTS

| | | | |
|---|---|---|---|
| 42/2,413 | 2/1967 | Japan | 260—533 N |
| 1,063,332 | 3/1967 | United Kingdom | 260—533 N |

OTHER REFERENCES

McCabe et al., Unit Operations of Chem. Eng'g., McGraw-Hill (1967), 2nd ed., pp. 517–639.

LORRAINE A. WEINBERGER, Primary Examiner

R. O. KELLY, Assistant Examiner

U.S. Cl. X.R.

260—531 R, 533 N, 604 R